(12) United States Patent
Hamzy et al.

(10) Patent No.: US 7,873,259 B2
(45) Date of Patent: Jan. 18, 2011

(54) SYNCHING A RECORDING TIME OF A PROGRAM TO THE ACTUAL PROGRAM BROADCAST TIME FOR THE PROGRAM

(75) Inventors: Mark J. Hamzy, Round Rock, TX (US); Johnny M. Shieh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1525 days.

(21) Appl. No.: 11/227,030

(22) Filed: Sep. 15, 2005

(65) Prior Publication Data

US 2007/0058949 A1 Mar. 15, 2007

(51) Int. Cl.
*H04N 5/91* (2006.01)
*H04N 7/26* (2006.01)

(52) U.S. Cl. .................................. 386/46; 386/124
(58) Field of Classification Search ............ 386/46
See application file for complete search history.

(56) References Cited

U.S. PATENT DOCUMENTS

| 6,208,799 B1 | 3/2001 | Marsh et al. | |
|---|---|---|---|
| 2006/0064721 A1* | 3/2006 | Del Val et al. | 725/41 |

OTHER PUBLICATIONS

Whitmore, Stuart, "Tale of the Tape", published date Apr. 13, 2001, vol. 27, No. 14, copyright Asia Week. Retrieved online from <http://www.asiaweek.com/asiaweek/technology/article/0,8707,105427,00.html> on May 16, 2005.

Coden, Anni, "Multi-Search of Video Segments Indexed by Time-Aligned Annotations of Video Content", Research Disclosure n. 431, Mar. 2000, article 191, p. 603, disclosed by International Business Machines Corporation.

Aras, CM, "Personal Television Schedule Service", Technical Disclosure Bulletin, vol. 39, n. 8, Aug. 1996, pp. 237-244, disclosed by International Business Machines Corporation.

\* cited by examiner

*Primary Examiner*—Marsha D Banks Harold
*Assistant Examiner*—Oluwaseun A Adegeye
(74) *Attorney, Agent, or Firm*—Matthew W. Baca; Amy J. Pattillo (57) ABSTRACT

A recording system receives a broadcast signal from at least one service provider. An offset controller of the recording system samples a portion of the current broadcast signal on a particular channel over a particular interval of time. The offset controller then compares the sampled portion with a selection of features anticipated to be broadcast during the particular interval of time. Next, if the offset controller detects that a particular feature from among the selection of features matches within the portion of the current broadcast signal, then the offset controller calculates an offset time from a difference between an expected time for broadcast of the particular feature and an actual time of broadcast. The recording time for a program to be recorded is initially set to the start time and end time from a predetermined broadcast schedule. The offset controller adjusts the recording time of the program that is affected by the offset time so that the recording time of the program is synched to the actual broadcast time of the program on the particular channel.

20 Claims, 6 Drawing Sheets

SYNCHING A RECORDING TIME OF A PROGRAM TO THE ACTUAL PROGRAM BROADCAST TIME FOR THE PROGRAM

BACKGROUND OF THE INVENTION

1. Technical Field

The present invention relates in general to broadcast recording and, particularly, to synching a recording time of a program scheduled for recording to the actual program broadcast time of that program.

2. Description of the Related Art

With the development of the VCR and its ability to record a television broadcast signal onto a video tape, individual recordings of television broadcasts became more accessible to consumers. As VCR technology advanced, users could program a VCR to begin recording the broadcast signal from a particular channel during a particular time period. In addition, there are now other types of television broadcast recorders, such as digital video recorders, available to consumers that record television programs onto a hard disk or other types of storage media.

Initially, many users found the user interface on VCRs, for programming the VCR to record a program in the future, difficult to use or understand. Now, many television broadcast recording devices are able to access a television program schedule and display the anticipated program schedule so that to select to record a scheduled program in the future, a user need only select the program block within the displayed television schedule and the recording device schedules itself to record the broadcast signal from the selected channel during the time period scheduled for the selected program in the anticipated program schedule.

While many programs actually broadcast during scheduled periods, there is potential for the actual broadcasting times of programs to vary from the anticipated schedule times. For example, causes of an actual broadcast time varying from a scheduled broadcast time include programs of indeterminate length, such as sports events and televised speeches, and local station overrides, such as local weather alerts where a scheduled program is still played from the local station in its entirety. When an actual broadcast time of a program varies from the scheduled broadcast time, then starting and stopping recordings based on an anticipated schedule time will result in only a recording a portion of the scheduled program. For example, if a user selects in a schedule to record a program scheduled to air from 7 PM to 8 PM, but the program actually starts broadcasting fifteen minutes late because it follows a football game that exceeded its scheduled time by fifteen minutes, then only the portion of the program airing from 7:15 PM to 8 PM is recorded and the user will miss getting to watch the last fifteen minutes of the program from the recording. Thus, while facilitating recording selections from an anticipated program schedule simplifies user interaction with a television broadcast recorder, the television broadcast recorder is limited because only portions of selected programs are recorded when actual broadcast times vary from the scheduled times.

SUMMARY OF THE INVENTION

In view of the foregoing, an improved recording system automatically synchs the recording time of a program, selected by the user to be recorded, to the actual program broadcast time.

According to one embodiment, an offset controller of the recording system samples a portion of the current broadcast signal on a particular channel over a particular interval of time. The offset controller then compares the sampled portion with a selection of features anticipated to be broadcast during the particular interval of time. Next, if the offset controller detects that a particular feature from among the selection of features matches within the portion of the current broadcast signal, then the offset controller calculates an offset time from a difference between an expected time for broadcast of the particular feature and an actual time of broadcast. The recording time for a program to be recorded is initially set to the start time and end time from a predetermined broadcast schedule. The offset controller adjusts the recording time of the program that is affected by the offset time so that the recording time of the program is synched to the actual broadcast time of the program on the particular channel.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

In the present invention, a recording system is described with emphasis on a recording system that records television program broadcasts by television service providers. It is important to note that the recording system may also record programs from data streams over a packet-switching network and other information accessible via a network. In addition, it is important to note that a single recording system may detect and record signals across multiple bandwidths and from multiple service providers.

A user may request that the recording system record selected programs from a published or predetermined program schedule or other method of selecting recording times. While a program is typically scheduled for a particular time slot, programs do not always run within the scheduled program slot for many reasons. A scheduled program may start early, start late, end early and end late. In particular, certain types of programs may be scheduled with fixed times within a broadcast schedule, but in reality the start or end time for airing the program is indeterminate before hand. Examples of programs with an indeterminate start or end time include sports events, speeches, and emergency news events. For example, a broadcast schedule may include a football game scheduled to broadcast from 2 PM to 5 PM, however if the game actually lasts until 5:30 PM, all programs scheduled to broadcast after the football game may broadcast with a 30 minute delay.

With the potential for actual broadcast times to differ from scheduled broadcast times, to ensure recording of the entire actual program broadcast, the recording system periodically samples portions of the current broadcast signal, compares the sampled portions to a database of features to identity which program and which portion of that program is currently broadcasting, calculates an offset time between the expected time for the feature to broadcast and the actual time of broadcast from the sampling, and responsive to calculating an offset time above a particular threshold, adjusts the recording schedules by the offset time for any effected scheduled recordings. In particular, by calculating an offset time between the actual broadcasting times and the scheduled broadcasting times, the recording system can more accurately start and stop the recording of a program to record the entire program duration.

Figure 1:
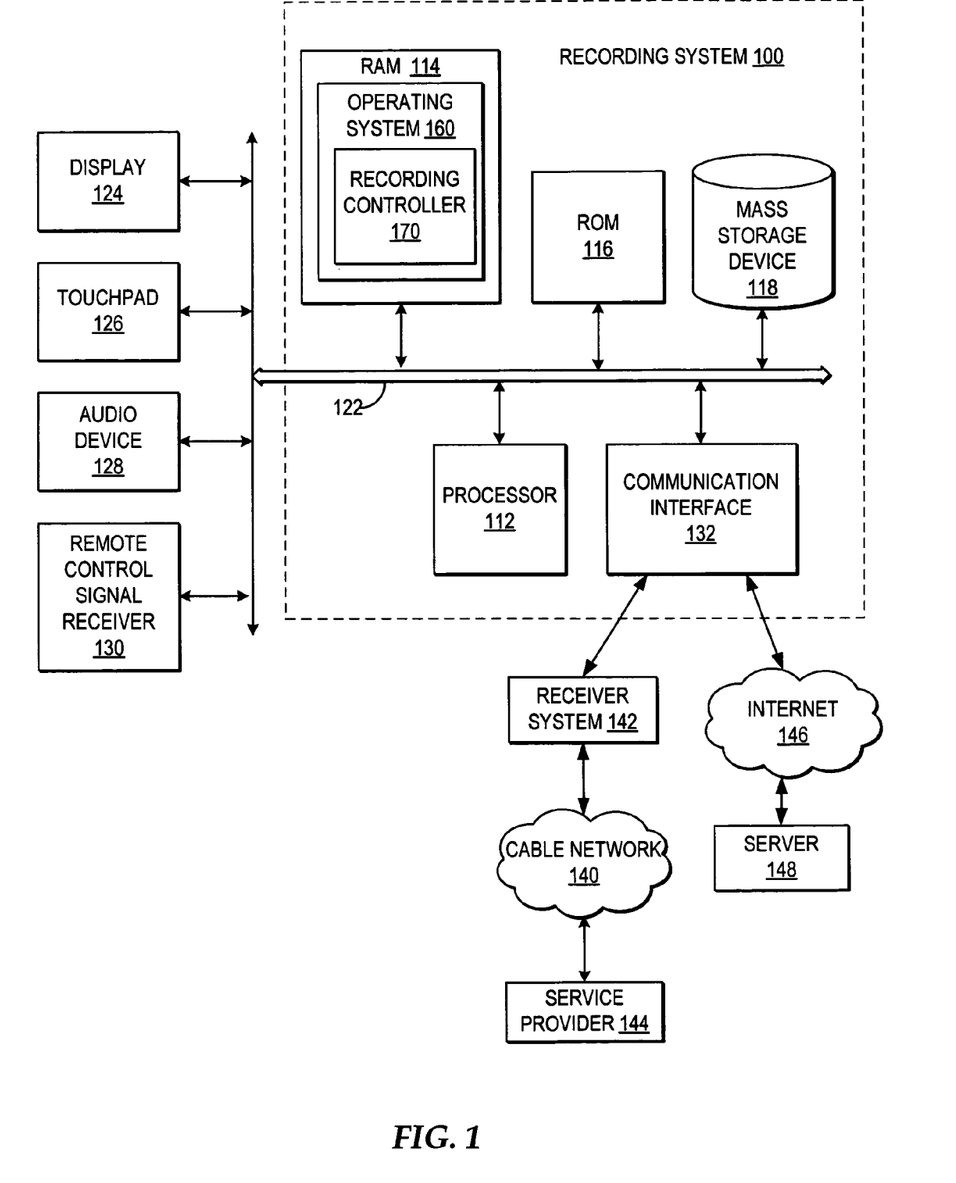
FIG. 1 is a block diagram depicting one embodiment of a recording system through which the present method, system, and program may be implemented

Referring now to the drawings and in particular to FIG. 1, there is depicted one embodiment of a recording system through which the present method, system, and program may be implemented. The invention may be executed in a variety of systems, including a variety of computing systems and electronic devices.

Recording system 100 includes a bus 122 or other communication device for communicating information within computer system 100, and at least one processing device such as processor 112, coupled to bus 122 for processing program code and data. Bus 122 may include low-latency and higher latency paths that are connected by bridges and adapters and controlled within computer system 100 by multiple bus controllers. Processor 112 may be a general-purpose processor such as IBM's PowerPC (PowerPC is a registered trademark of International Business Machines Corporation) processor.

Processor 112 is coupled, directly or indirectly, through bus 122 to memory elements. During normal operation, processor 112 processes data under the control of program code accessed from the memory elements. Memory elements can include local memory employed during actual execution of the program code, such as random access memory (RAM) 114, bulk storage, such as mass storage device 118, and cache memories (not depicted) which provide temporary storage of at least some program code to reduce the number of times code must be retrieved from bulk storage during execution. In one example, the program code accessible in RAM 114 includes, for example, an operating system 160 that facilitates recording controller 170. Operating system 160 includes program code that facilitates, for example, a graphical user interface (GUI) via a display 124 and other output interfaces. It will be understood that recording controller 170 may be separate application software from operating system 160 or integrated into operating system 160. Further, it will be understood that recording system 100 may include multiple operating systems and additional application software for facilitating the invention.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc. For example, in one embodiment, operating system 160 and/or recording controller 170 contains program code that when executed on processor 112 carry out the operations depicted in the flow diagrams and flowchart of FIGS. 9 and 10 and other operations described herein. Alternatively, the steps of the present invention might be performed by specific hardware components that contain hardwired logic for performing the steps, or by any combination of programmed computer components and custom hardware components. Additionally, RAM 114 may include an application programming interface (not depicted) or other interface that provides extensions to enable application developers to develop recording controller 170 that extends the functionality of operating system 160.

In addition, the invention can take the form of a computer program product accessible from a computer-usable or computer readable medium providing computer readable program code for use by or in connection with computer system 100 or any instruction execution system. For purposes of this description, a computer-usable or computer readable medium can be any apparatus that can contain, store, communicate, propagate, or transport the program for use by or in connection with the instruction execution system, apparatus, or device. In one example, a computer-usable or computer readable medium is any apparatus that participates in providing program code to processor 112 or other components of computer system 100 for execution.

Such a medium may take many forms including, but not limited to, electronic, magnetic, optical, electromagnetic, infrared, or semiconductor system (or apparatus or device) or a propagation medium. Examples of a computer readable medium include, but are not limited to, a semiconductor or solid state memory, magnetic tape, a flexible disk, a hard disk, a removable computer diskette, random access memory (RAM) 114, read-only memory (ROM) 116, punch cards or any other physical medium with patterns of holes, a rigid magnetic disk and an optical disk. Current examples of optical disks include a compact disc ROM (CD-ROM), a compact disc-read/write (CD-R/W) and a digital video disc (DVD). In another example, a computer readable medium may include mass storage device 118, which as depicted is an internal component of computer system 100, but may be provided as a device external to computer system 100.

A communication interface 132 facilitates receipt of a broadcast signal and a program schedule. In addition, communication interface 132 may facilitate other types of communications to and from recording system 100.

In one example, a service provider 144 provides a data signal through a cable network 140 that may include a television broadcast signal, program scheduling, and other data. Cable network 140 may include wired, wireless, and satellite based signal transmissions. To facilitate receipt of signal transmissions from service provider 144, communication interface 132 may detect signal transmissions from a local receiver system 142 external to recording system 100 that is authorized to receive all or portions of the data signal from cable network 140. Alternatively, communication interface 132 may incorporate a receiver system, such that recording system 100 enables both receipt and recording of television broadcast signals from cable network 140. For example, many cable companies provide a single device that performs both as a receiver and as a recording system. The actual connections between service provider 144, cable network 140, cable receiver 142, and communication interface 132 may include standard wired cable connections and wireless cable connections. Each cable connection may support a single or multiple bandwidths of data signals.

In another example, recording system 100 communicates with one or more server systems, such as a server 148, via a packet switching network 146. Packet switching network 146 may refer, for example, to the worldwide collection of networks and gateways that use a particular protocol, such as Transmission Control Protocol (TCP) and Internet Protocol (IP), to communicate with one another. Server 148 may transfer data, such as a program schedule or recorded clips of identifying features of programs, and may stream scheduled audio or video programs.

In general, cable network 140 and packet switching network 138 use electrical, electromagnetic, or optical signals that carry audio, video and data streams. The signals through the various networks and the signals passing through communication interface 132, which carry the audio, video or data to and from recording system 100, are examples of forms of carrier waves transporting the information. In one example, a remote computer, such as server 148 transfers the program code for the invention to requesting recording system 100 by way of data signals embodied in a carrier wave or other propagation medium via a connection to communication interface 132.

In addition, recording system 100 may include at least one interface that facilitates communication or a communication feature, implemented through an input or output device. These input/output devices are coupled to recording system 100 either directly or indirectly through wired and wireless connections to multiple input/output (I/O) controllers, adapters, and expansion slots coupled to one of the multiple levels of bus 122. For example, an audio device 128 is connectively enabled on bus 122 for controlling audio outputs and inputs. A display device 124 is also connectively enabled on bus 122 for providing visual, tactile or other graphical representation formats. A touchpad 126 is connectively enabled on bus 122 as an interface for user inputs to recording system 100. A remote control signal receiver 130 is connectively enabled on bus 122 for controlling receipt of signals generated by a separate remote control device (not depicted) responsive to user selections from among the input interface of the separate remote control device, as will be understood by one with skill in the art. In alternate embodiments of the present invention, additional input and output devices may be added.

Those of ordinary skill in the art will appreciate that the hardware depicted in FIG. 1 may vary. Furthermore, those of ordinary skill in the art will appreciate that the depicted example is not meant to imply architectural limitations with respect to the present invention.

Figure 2:
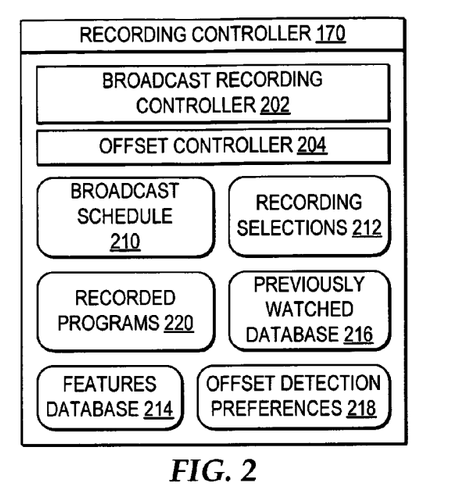
FIG. 2 is a block diagram illustrating one embodiment for components and data controlled by a recording controller within a recording system.

With reference now to FIG. 2, a block diagram depicts one embodiment for components and data controlled by a recording controller within a recording system. It will be understood that recording controller 170 may include additional or alternate components and that the depiction of controllers and data within recording controller 170 are for purposes of illustration and not for imposing software modeling limitations.

In one embodiment, recording controller 170 includes a broadcast recording controller 202 that controls separating the signal of a selected channel for recording to a data storage medium, such as mass storage device 118 and organizes recordings according to title, date, and other information in recorded programs database 220.

In addition, broadcast recording controller 202 requests updates to broadcast schedule 210. Broadcast schedule 210 includes the anticipated schedule for program broadcasting on a single or multiple channels as set by a service provider, a particular channel, or other entity in control of scheduling programs for broadcast. For each program scheduling in broadcast schedule 210 may include additional information including, but not limited to, episode title, writers, actors, short description of the show, whether the episode is new or a rerun, and other information accessible for a scheduled program. In addition, broadcast schedule 210 may include schedules for multiple service providers. For example, broadcast schedule 210 may include a schedule for television broadcasts via cable and for video streaming broadcasts via the Internet.

Broadcast recording controller 202 enables display or other output of all or a portion of broadcast schedule 210 to a user requesting to view the schedule. In addition, broadcast recording controller 202 may enable display of broadcast schedule 210 where each program is selectable and upon user selection of a particular scheduled broadcast of a particular program, broadcast recording controller 202 adds a recording request for the particular program to recording selections 212. In another example, broadcast recording controller 202 may enable display of broadcast schedule 210 and provide a separate entry interface for user selection of program name or channel and time to record and upon user selection of a program name or channel and time to record, broadcast recording controller 202 looks up the program name in broadcast schedule 210 and adds a recording request for a single or multiple instances of the program or looks up the channel and time in broadcast schedule 210 and adds a recording request for the selected program. It will be understood that broadcast recording controller 202 may also implement other methods of facilitating user selections of programs to record, from a user interface.

Recording controller 170 also includes an offset controller 204. Offset controller 204 detects when scheduled programs actually start and end and calculates an offset time between the actual start and end times and the scheduled start and end times. Offset controller 204 monitors recording selections 212 and determines which current offset times affect programs scheduled for recording. In one embodiment, when offset controller 204 detects a program scheduled for recording affected by an offset, offset controller 204 may adjust the scheduled recording time of the program within recording selections 212. Alternatively, offset controller 204 may include a recording function for controlling recording of the portions of a program scheduled in recording selections 212 that are effected by the offset time. For example, where offset controller 204 is a plug-in to recording controller 170, offset controller 204 may perform the recording function.

In particular, offset controller 204 detects when scheduled programs actually start and stop by first sampling portions of current broadcast signals. Offset detection preferences 218 may include user specified preferences for directing offset controller 204 to sample current broadcast signals. In one example, to detect an identifying feature within a current broadcast, preferences 218 may direct offset controller 204 to sample a broadcast every fifteen seconds and then search the sampled broadcast for an expected identifying feature from features database 214 for a particular program scheduled for the current time. In another example, preferences 218 direct offset controller 204 to sample only before and after the scheduled ending of programs with indeterminate end times, such as all sporting events. In yet another example, to update features database 214, offset controller 204 may sample and store the first minute and last minute of each program between 4 PM and 11 PM each day.

Next, offset controller 204 compares the sampled portions with anticipated features of a program scheduled for broadcast during the sampling period and other types of features. As will be further described with reference to FIG. 4, a features database 214 includes multiple types of identifying features of programs and the duration into a program of each identifying feature. When offset controller 204 detects an anticipated feature matching a sampled portion, offset controller 204 calculates an offset time between when the identifying feature is actually detected in the sample and when the identifying feature was expected to be detected within the duration of a program. Then, offset controller 204 may adjust, by the offset time, the actual recording times of programs scheduled for recording that are effected by the offset time.

In particular, in comparing the sampled portions with anticipated features and other types of features, offset controller 204 may use multiple types of image, data, and audio comparison tools depending on the type of comparison. For image comparison, offset controller 204 may use simple or complex byte comparison tools. In one example, offset controller 204 may cache broadcast signal images as JPEGs or GIFs. A byte comparison tool of offset controller 204 then moves through the images at a particular granularity to determine the percentage of common bytes between the broadcast signal image and the anticipated or other features. For audio comparison, offset controller 204 may cache audio samples, for example from the opening or closing audio tracks of a program, as MP3s. A Digital Signal Processing tool of offset controller 204 scans and compares the MP3s with anticipated or other audio features and calculates a matching percentage. For keyword comparison, offset controller 204 searches the closed captioning stream with a text analyzer to detect specific types of characters and determine a matching percentage of sampled words to feature words. It will be understood that other types of image, data, and audio comparison tools may be implemented in offset controller 204 and that a user may select preferences for the granularity of comparison and a user may specify thresholds, above which a matching percentage must rise to be considered a match.

Further, in sampling the broadcast signal, it is important to note that offset controller 204 stores the sampled signal stream in a data cache. In one example, offset controller 204 samples a first thirty seconds of a program and then through comparison of the sampled portion with anticipated features, determines that the program started at the beginning of the sample. Offset controller 204 would then trigger recording of the program to start and would add the sampled portion from the data cache to the front of the recording, so that the recording of the show includes the broadcast during the period of time in which offset controller 204 determined when the show actually started. In the examples described throughout, it can be assumed that samples are cached and that once recording of a program starts, any applicable samples can be added to the beginning or ending of a program recording.

After a user watches a particular episode of a recorded program, a portion of the recorded program, such as the first minute, may be stored in previously watched database 216. If a user selects to only record previously unwatched episodes of a particular show or segment of a show, then offset controller 204 may compare sampled portions of a current broadcast of the program with the recorded segments for that program in previously watched database 216 to determine whether the episode was previously watched. If offset controller 204 detects a previously watched episode, then offset controller 204 may delete the recording order for the episode of the program in recording selections 212 or direct broadcast recording controller 202 to stop recording the episode. In another example, previously watched database 216 may include the program information for previously watched episodes of programs, such that offset controller 170 need only compare the program information for the episode currently broadcast, such as the show title, with the previously watched show title to determine whether to delete the recording order for the episode.

In addition to automatically adjusting the actual recording times of programs by the offset time, offset controller 204 may publish the offset time in multiple separate interfaces and enable the user to selecting programs to record from each of the separate interfaces. In one example, if a television connected to recording system 100 is on, offset controller 204 publishes the offset time to the television display, overlapping a current broadcast image, with an option to adjust the recording or select additional recordings in view of the offset. In another example, if selected by a user, offset controller 204 publishes the offset time in an electronic communication to a portable electronic device and enables recording selection options by the user via the portable electronic device.

Figure 3:
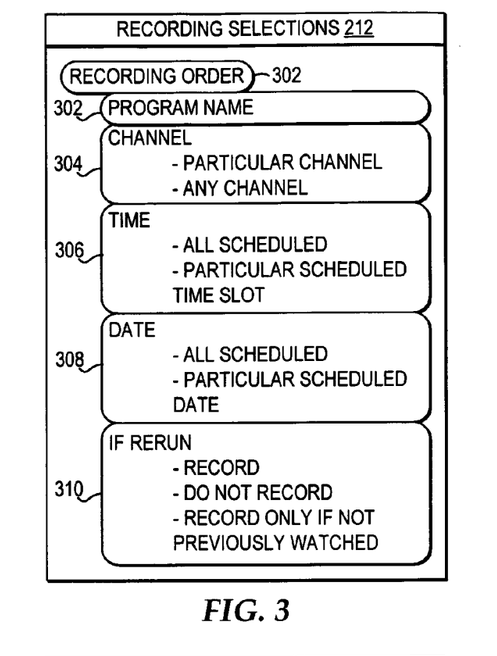
FIG. 3 is a block diagram depicting one embodiment of recording specifications in a recording selections database.

Referring now to FIG. 3, a block diagram depicts one embodiment of recording specifications in a recording selections database. In the example, recording selections database 212 may include multiple recording order entries, such as recording order entry 300. Each entry may identify multiple types of criteria for specifying the recording order.

In the example, recording order entry 300 may identify a program name, as illustrated at reference numeral 302. The program name may include an episode title, segment title or other name based information.

In addition, recording order entry 300 may identify channel information, as indicated at reference numeral 304. In the example, channel information may specify a particular channel or allow for any channel that includes the program name and meets any other recording criteria.

Further, recording order entry 300 may identify a start and stop time for recording, as indicated at reference numeral 306. In the example, time information may specify to record scheduled broadcasts of a program at any time or broadcasts during a particular time slot, as limited by any other recording criteria.

Recording order entry 300 may also identify a date for recording, as indicated at reference numeral 308. In the example, date information may specify to record scheduled broadcasts of a program on any date or broadcasts on a particular scheduled date, as limited by any other recording criteria.

Further, recording order entry 300 may identify rerun preferences, as indicated at reference numeral 310. In the example, rerun preferences may specify that if determines that an ordered recording is a rerun, to either always record, not record, or record only if not previously watched. In particular, broadcast schedule 210 may include information received about whether a program is a rerun or offset controller 204 may identify an ordered recording as a rerun.

It will be understood that recording order entries may include other or alternate information and selections based on the user interface available to the user for making recording selections. For example, where multiple individuals submit requests for a single recording system to record programs, the recording order entry may include an entry indicating which individual requested the recording. In another example, where the storage space for recording programs is limited, a recording entry may include an entry indicating a recording priority level assigned to the recording, such that broadcast recording controller 202 always records entries with highest priority and may delete low priority recordings to allow sufficient space for higher priority recordings.

Figure 4:
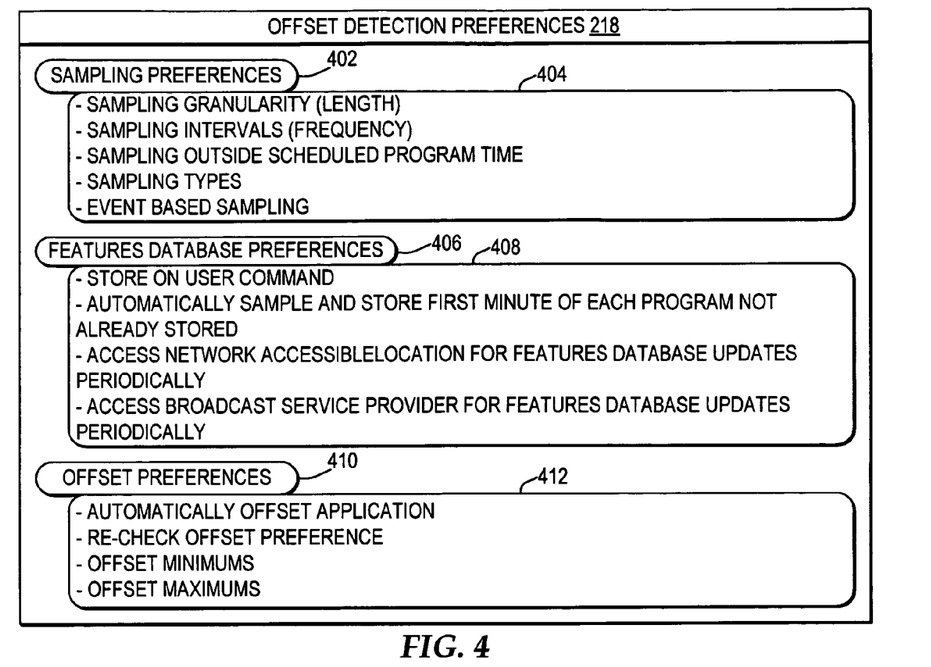
FIG. 4 is a block diagram illustrating one embodiment of types of offset detection preference specifications within offset detection preferences.

With reference now to FIG. 4, a block diagram depicts one embodiment of types of offset detection preference specifications within offset detection preferences. In the example, offset detection preferences 218 include entries classified as sampling preferences 402 and features database preferences 406 for specifying performance of offset controller 204. It will be understood that offset detection preferences 218 may also include additional or alternate types of preferences.

Sampling preferences 402 may include multiple types of sampling settings, as indicated at reference numeral 404. The sampling granularity setting designates the length of a sample, each time a sample is triggered, the sampling intervals setting designates the frequency or preferred times for sampling, and the sampling outside scheduled program time setting designates the scope of any sampling to be done before or after scheduled program times. Further, each of the sampling settings may be specified according to a specific program, type of program, time of day, channel, or other recording criteria.

In one example of sampling settings, a user selects to monitor for offsets by sampling the first minute of each scheduled program and search the first minute for a feature expected to broadcast during the first minute. If the expected feature is not included in the first minute sample, then the user may select to sample again in thirty seconds and search the next sample for the expected feature and continue this pattern of sampling until the expected feature is located.

In another example of sampling settings, a user selects to sample, every ten seconds, the last two minutes of the program broadcasting before a scheduled recording to search for the start sequence feature for the program scheduled to be recorded.

In yet another example of sampling settings, a user may select that once and offset is calculated, sampling occur at each fifteen minute interval to detect when the offset is compensated for by a network. For example, if a football game goes over scheduled time by 20 minutes until 7:20 PM and the network broadcasts all programs in their entirety with a 20 minute offset detected, the network may shorten the news scheduled for 10 PM until 11 PM to only run from 10:20 PM until 11 PM. By sampling every 14 minutes, offset controller 204 would determine that the program scheduled for 11 PM has started and for any scheduled recordings starting at 11 PM or thereafter, the offset of 20 minutes no longer applies.

In addition, to general sampling settings, a different set of sampling settings may be specified for a particular type of program event. For example, specific sampling preferences may be specified for programs with an indeterminate start or end time, such as all sporting events. A user may specify sampling intervals more likely to correspond with a sporting event, than with prime time sitcom broadcasts, for example. Further, event based sampling preferences may be triggered by detection of a particular type of feature in a sample during a program with an indeterminate start or end time. For example, a user may select a sampling setting that if during the sampling period of a football or soccer game offset controller 204 detects a video image without a green background for one minute, then offset controller 204 performs additional sampling to determine whether the game has ended prematurely. In another example, a user may select a sampling setting that if when comparing a sample to features, offset controller 204 detects a weather alert feature, additional sampling to detect the start of a next scheduled program is triggered.

Further, in specifying general or event based sampling settings, a user may specify sampling types. Types of sampling include, but are not limited to, video samples, audio samples, graphical samples, closed caption samples. For example, a user may select to sample a closed caption stream for the first minute of each scheduled program because features database 214 includes keywords anticipated to be included in the first minute of the scheduled program. Further, when sampling and searching for the end of an indeterminable program, such as a sporting event, closed caption streams may be sampled so the stream can be quickly searched for keywords indicative of the end of the sporting event.

Features database preferences 406 may include multiple types of feature access and storage preferences, as indicated at reference numeral 408. Examples of preferences include storing a feature clip into features database 214 upon user command, automatically sampling and storing the first minute of any program not already stored in features database 214, periodically accessing one or more network accessible locations for updates to features database 214, and periodically accessing a broadcast service provider for updates to features database 214.

Additionally, features database preferences 406 may specify comparison preferences for selecting which types of features to compare with samples. For example, a user may specify a preference to only compare the features for the program that is scheduled during the sampling period. In another example, a user may specify a preference to also compare the features for programs scheduled before and after the sampled program. Further, a user may specify a preference to compare particular program types for particular types of programming. For example, a user may specify a preference to compare sporting event type features with samples of a scheduled sporting event. It will be understood that in addition to user specified comparison preferences, offset controller 204 may automatically select particular features to compare with a current broadcast sample in locating the actual start and end times of programs.

Offset preferences 410 may include preferences for responding to different lengths of offsets, as indicated at reference numeral 412. For example, a user may select a preference to automatically apply a calculated offset to all programs on the channel following the offset calculation or alternatively to automatically recheck the offset at each scheduled program change. In addition, user may select a preference to only offset the end time of each effected scheduled recording. Further, a user may select that if an offset is less than a particular time, such as 10 seconds, to ignore the offset. Another user selection may require that if the offset is greater than a particular time, such as 44 minutes, offset controller 204 should search broadcast schedule 210 for other scheduled broadcasts of the same program at the same time or another time on the same or another channel, and begin or schedule recording of the alternate broadcast.

Figure 5:
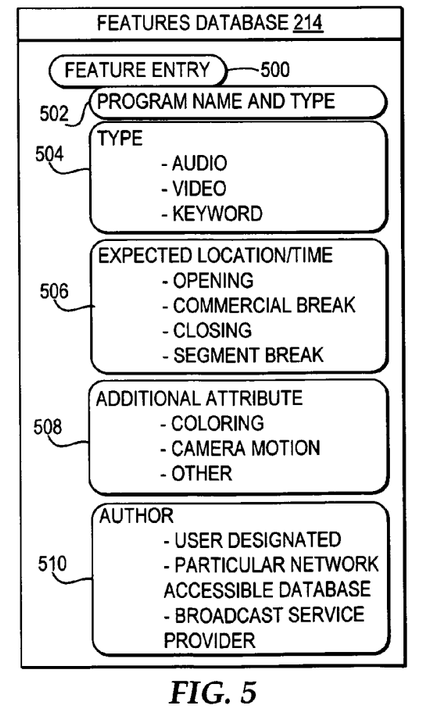
FIG. 5 is a block diagram depicting one embodiment of feature specifications in a features database.

Referring now to FIG. 5, a block diagram depicts one embodiment of feature specifications in a features database. In the example, feature database 214 may include multiple feature clips catalogued by feature entries, such as feature entry 500. Each feature entry may identify multiple types of information that describes a feature. Offset controller 204 compares current broadcast samples with one or more feature entries in feature database 214 to determine In the example, a feature entry 500 may identify program information, as illustrated at reference numeral 502. Program information may include, for example, the program name or type and additional information, such as the episode title. A program entry referenced according to a program type may include a feature of a particular type of sport broadcast, such as the green grass common in football broadcasts or the wide angle shot of a field common in soccer broadcasts. In another example, a program type may include a feature of a particular keyword or phrase often included in the closed caption stream at the conclusion of a sporting event.

Feature entry 500 may identify the type of feature, as indicated at reference numeral 504. In the example, the type of feature includes selections from among an audio feature, video feature, or keyword feature.

In particular, the keyword feature may include words or phrases for comparison with a sampled closed caption stream. Further, to aid identification of the start and stop time of a program, special types of characters or keywords may be specifically insert into the closed caption stream for a program to identify the start and end of the program. For example, a sequence of symbols, such as and, might identify the start and end of a program in the closed caption stream. As new or alternate closed caption start and end time identifiers are created, additional features entries may be added to feature database 214.

In addition, feature entry 500 may identify the expected location of the feature within the program, as illustrated at reference numeral 506. In the example, the expected location is specified by a relative location, such as within an intro or closing or at a commercial break or segment break. A relative location may include a range of expected time periods for broadcast within the scheduled program length. In an alternate example, the expected location may be specified by a particular time within the total play time for the program, such as specifying that a particular feature is expected to be broadcast exactly 33 seconds into a program time and last for four seconds.

Further, feature entry 500 may identify additional attributes of the feature, as illustrated at reference numeral 508. For example, additional attributes of a feature clip may include specific coloring, camera motion, specific faces, or other attributes that facilitate scanning for and identification of the feature within an actual broadcast.

Feature entry 500 may also identify the author of the feature stored in feature database 214, as identified at reference numeral 510. For example, authorship may include being user designated, accessed from a particular network accessible database, or accessed from a broadcast service provider. In one example, a user may select to record a particular portion and type of a program broadcast for storage in features database 214. In another example, a user may select for offset controller 204 to download features from server 148. Program providers may set up websites with program features available for download, for example. Further, in another example, features database 214 may automatically receive feature updates from a service provider via a cable network.

In particular, in enabling a user selection to record a particular portion and type of program broadcast for storage in features database 214, a user may set parameters for recording samples and may interact with offset controller 204 to designate the type of features and the expected location of the feature. For example, a user may select for offset controller 204 to scan the first and last five minutes of multiple recorded versions of the same program and identify the most common elements in the first and last five minutes. Offset controller 204 would display the most common elements in images on the display interface. The user would select which images represent the opening of the program and which elements represent the closing of the program. For example, in cases where the opening and closing credits for a program change from season to season, the user interacts with offset controller 204 to specify current features in feature database 214.

Figure 6:
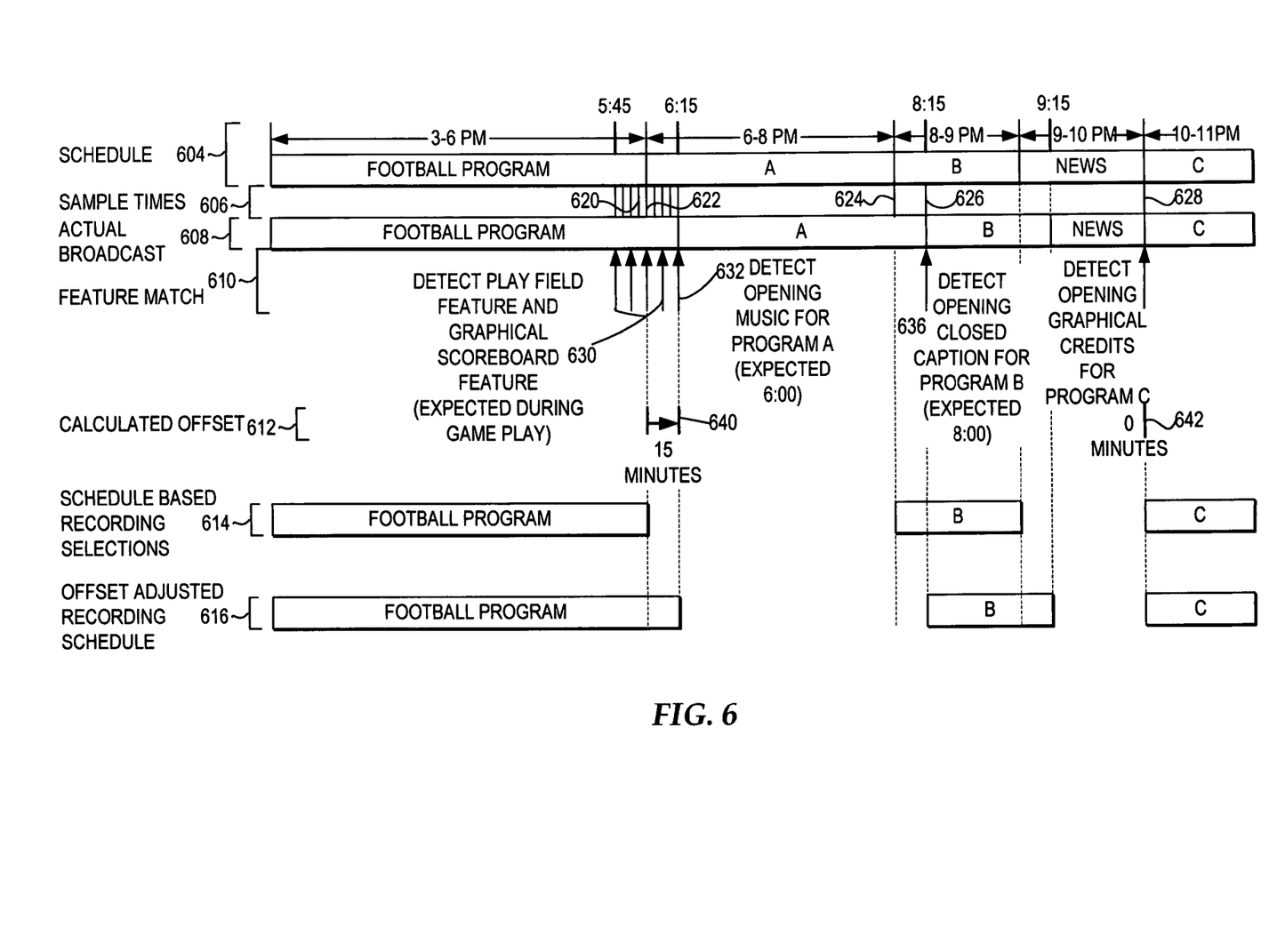
FIG. 6 is a flow diagram illustrating an offset controller detecting offsets and applying offsets to recording times of scheduled program recordings.

With reference now to FIG. 6, a flow diagram illustrates an offset controller detecting offsets and applying offsets to recording times of scheduled program recordings. In the example, a section of the flow diagram illustrates a schedule 604. Schedule 604 indicates the programs scheduled to broadcast on a particular channel between 3 PM and 10:30 PM. In comparison, the flow diagram illustrates an actual broadcast time, as illustrated at reference numeral 608, which varies from the scheduled broadcast time from 6:00 PM to 10 PM. In the example, the football program is scheduled to run from 3 PM to 6 PM, however sporting events are often scheduled for a particular time slot, but will continue broadcasting beyond a schedules time if the sporting event runs longer than scheduled.

The schedule based recording selections, illustrated in the flow diagram at reference numeral 614 indicate the program recording selections made by a user including the football program, program B, and program C. In the example, the user selected recordings based on the scheduled program times illustrated in schedule 604.

Offset controller 204 begins sampling portions of the football program 15 minutes prior to the scheduled ending to the program at the intervals depicted at reference numeral 620. In addition, offset controller 204 continues sampling portions of the football game after the scheduled ending the program at the intervals illustrated at reference numeral 622.

In the example, for each sample, offset controller 204 compares selected features from features database 214 with the sampled broadcast. For each sample, offset controller 204 may select features anticipated for a range of time before, after, and during the current time or for the program type. In the flow diagram those feature matches between a sample and a particular feature are illustrated at reference numeral 610.

In one example of feature matching, as illustrated at reference numeral 630, offset controller 204 locates matches between samples and the compared features of a "play field feature" and a "graphical scoreboard feature". The "play field feature" may include, for example, video colors, camera angles, and movements that are associated with a broadcast of a field based sporting event. The "graphical scoreboard feature" may include, for example, typical attributes of a graphical scoreboard. By matching these features to the sample, offset controller 204 is able to infer that the football program is still broadcasting. In the example, it is also apparent that every sample may not necessarily match a feature.

In addition, in the example, at reference numeral 632, the sampling taken at 6:15, during the scheduled broadcast of program A, matches the opening music feature for program A, which was expected to air at 6:00 PM. Thus, upon detecting the opening music for program A, starting at 6:15 PM, offset controller 204 calculates an offset of 15 minutes, as illustrated at reference numeral 640.

In the example, for the actual recording of the football program, offset controller 204 continues to detect play field features and graphical scoreboard features for 15 minutes. In particular, as illustrated in the flow diagram at reference numeral 616, the offset adjusted actual recording of the football program is extended beyond the schedule based recording selections illustrated at reference numeral 614 until a feature for program A is detected. In one embodiment, offset controller 204 extends the recording by incrementally sampling the broadcast signal after the scheduled end time until the actual end time is detected, storing the samples in a data cache, and adding the samples to the end of the program recording incrementally or all together when the actual end time is detected. In another embodiment, offset controller 204 extends the recording by incrementally extending the end time for the program until the actual end time is detected, and then removing any excess recording from the program recording.

Next, program B is scheduled for recording in the schedule based recording selections illustrated at reference numeral 614, however the actual broadcast of program B is offset by 15 minutes. In one embodiment, offset controller 204 may rely on the current offset calculated illustrated at reference numeral 640 and apply the 15 minute offset to the recording time of program B in recording selections 212. In another embodiment, offset controller 204 may sample the broadcast at the scheduled start time of program B of 8:00 PM and detect whether a feature indicating the start of program B is included in the sample. In the example, offset controller 204 does not detect a match between any of the features for program B in the sample illustrated at reference numeral 624. Offset controller 204 then samples the broadcast at the offset start time of program B of 8:15 and detects whether a feature indicating the start of program B is included in the sample. In the example, offset controller 204 detects a match between the opening words for the start of program B in the closed captioning of the sample illustrated at reference numeral 626. In the example, offset controller 204 adjusts the start and end times for recording program B by the offset of 15 minutes. In another embodiment, offset controller 204 may not adjust the recording start time, but upon detection of an actual delayed start time, would extend the recording time for the program by the calculated offset.

Further, program C is scheduled for recording in the schedule based recording selections illustrated at reference numeral 614 and the actual broadcast of program C is as scheduled. In the example, a news program is scheduled to air from 9 PM to 10 PM. In order to return programs back to the regular schedule, the news for the channel is shortened by 15 minutes to air from 9:15 PM to 10 PM. According to preferences, offset controller 204 always samples before offsetting a recording following a live program, such as the news. By sampling at 10 PM, as illustrated at reference numeral 628, offset controller 204 detects that the sample at 10 PM matches the opening graphical credits feature for program C which is expected to air at 10 PM. Next, offset controller 204 calculates a new offset of zero, as illustrated at reference numeral 642 and program C is recorded during the scheduled times.

In the example depicted, the offset of 15 minutes is caused by a scheduled program exceeding the scheduled broadcast time. In another example, emergency weather updates during a program broadcast where the network still broadcasts the entirety of the program may also cause offsets that could be detected by sampling during the program or sampling to detect the offset end time of the program and the offset start time of a next program.

Figure 7:
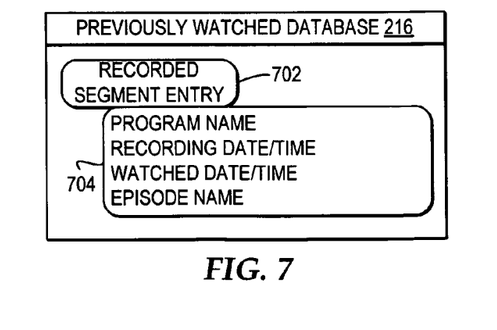
FIG. 7 is a block diagram depicting one embodiment of stored information with recorded segments in a previously watched database.

Referring now to FIG. 7, a block diagram depicts one embodiment of stored information with recorded segments in a previously watched database. In the example, previously watched database 216 may include multiple recorded program segments from previously watched segments. In one example, a recorded segment entry 700 identifies multiple types of information for the recorded segment. For example, as illustrated at reference numeral 702, a recorded segment entry is identified by the program name, recording date and time, the date and time the recorded segment entry was watched and the episode name. In addition, other information such as the user who previously watched the recorded segment, a rating given to the previous recording, and other information related to the particular previous viewing of the program may be included.

Figure 8:
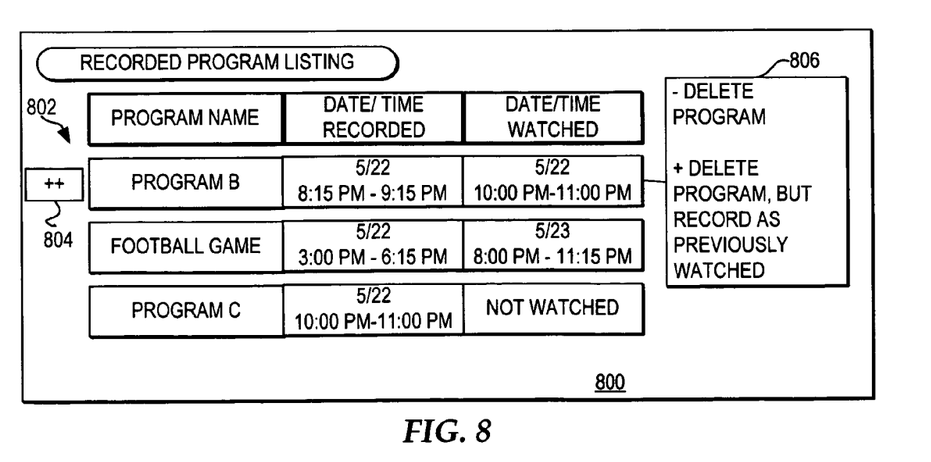
FIG. 8 is an illustrative user interface illustrating selectable options for deletion of previously views programs.

With reference now to FIG. 8, an illustrative user interface depicts selectable options for deletion of previously views programs. In the example, a user interface 800 includes listings of the programs stored in recorded programs database 220. In one example, a user has selected an entry 804, as illustrated by indicator 802. Upon selection of entry 804, a selection list 806 is displayed which includes an option to delete the entry or to delete the entry, but store a first minute of the entry in previously watched database 216. Upon selection to delete the entry, but store a first minute in previously watched database 216, offset controller 204 includes the first minute of the entry in previously watched database 216 as a recorded segment entry 800 with additional information as described with reference to FIG. 7.

Figure 9:
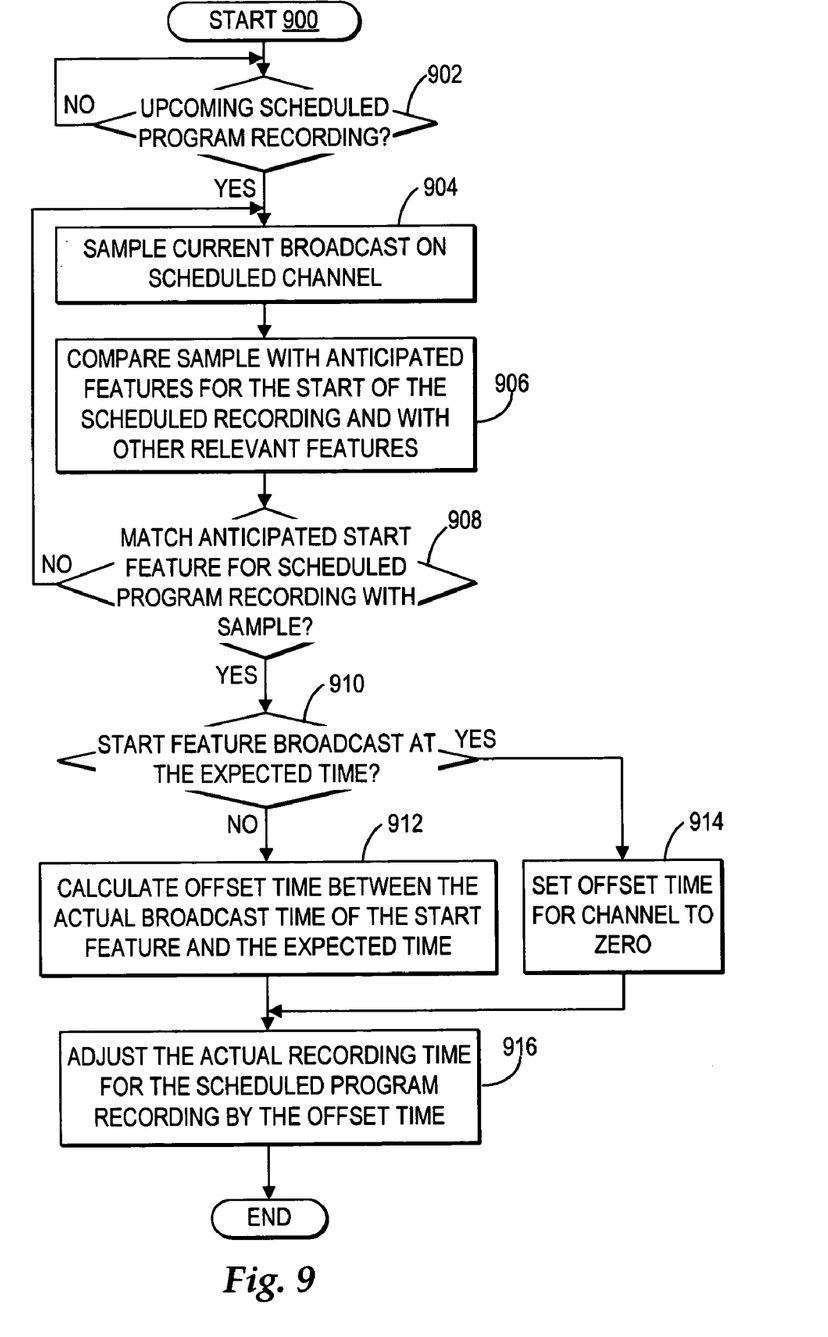
FIG. 9 is a high level logic flowchart depicting a process and program for detecting whether an actual start time for a program scheduled for recording matches the scheduled start time and applying an offset to the recording schedule if the times do not match.

Referring now to FIG. 9, a high level logic flowchart depicts a process and program for detecting whether an actual start time for a program scheduled for recording matches the scheduled start time and applying an offset to the recording schedule if the times do not match. In the example, the process starts at block 900 and thereafter proceeds to block 902. Block 902 depicts a determination whether there is an upcoming scheduled program recording. In one example offset controller 204 may select a time period before a scheduled program recording to start searching for anticipated start features of the scheduled recording or to detect anticipated end features of the program preceding the scheduled recording. Alternatively, a user may set preferences for prerecording sampling in offset detection preferences 218. In the example, if an upcoming scheduled recording triggers sampling, then the process passes to block 904; otherwise the process iterates until sampling is triggered.

Block 904 depicts offset controller 204 sampling the current broadcast on the scheduled channel. Next, block 906 illustrates offset controller 204 comparing the sample with the anticipated features for the start of the scheduled recording and with other relevant features. Other relevant features may include features anticipated for the program preceding the program scheduled for recording. Thereafter, block 908 depicts offset controller 204 determining whether any of the anticipated start features for the scheduled program recording match the sample. If the sample does not match the anticipated start features, then the process returns to block 904. Although not depicted, in addition to determining whether the sample matches the anticipated start features, offset controller 204 may determine whether the sample matches anticipated features of the scheduled program preceding the recording selection and continue sampling if the sample matches the anticipated features of the preceding scheduled program.

Returning to block 908, if the sample matches the anticipated start features, then the process passes to block 910. Block 910 depicts offset controller 204 determining whether the start feature broadcast at the expected time. If the start feature broadcast at the expected time, then the process passes to block 914. Block 914 illustrates offset controller 204 setting the offset time for the channel to zero, and the process passes to block 916. Otherwise, at block 910, if the start feature did not broadcast at the expected time, then the process passes to block 912. Block 912 depicts offset controller 204 calculating an offset time between the actual broadcast time of the start feature and the expected broadcast time of the start feature. Next, block 916 depicts offset controller 204 adjusting the actual recording time for the scheduled program recording by the offset time, and the process ends. In adjusting an actual recording time, any portions of a program that are sampled and held in cache may be added to start or end of a recording of a program to complete the program recording. Further, in one embodiment, adjusting the actual recording time for the scheduled program recording by the offset time may only require adjusting the recording end time by the offset time; in another embodiment adjusting the actual recording time for the scheduled program recording may include also deleting the portion of the broadcast recorded from the scheduled start time to the actual start time of the program by the offset time.

Figure 10:
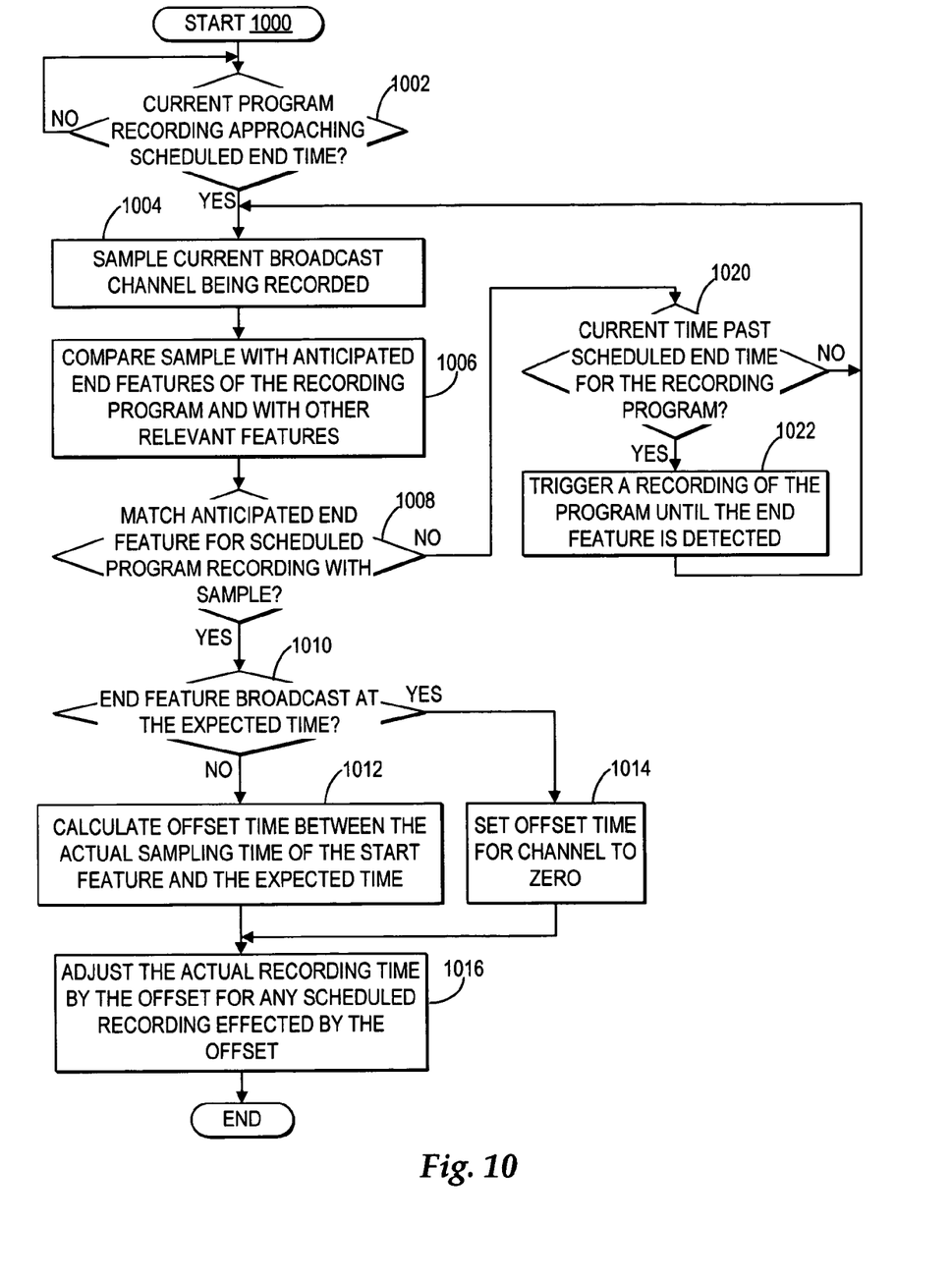
FIG. 10 is a high level logic flowchart illustrating a process and program for detecting whether an actual end time for a program being recorded matches the scheduled end time and extending the recording if the times do not match.

With reference now to FIG. 10, a high level logic flowchart depicts a process and program for detecting whether an actual end time for a program being recorded matches the scheduled end time and extending the recording if the times do not match. In the example, the process starts at block 1000 and thereafter proceeds to block 1002. Block 1002 depicts offset controller 204 determining whether the current program recording is approaching the scheduled end time. If the current program recording is approaching the scheduled end time, then the process passes to block 1004.

Block 1004 depicts offset controller 204 sampling the current broadcast on the channel being recorded. Next, block 1006 illustrates offset controller 204 comparing the sample with the anticipated features of the end of the program being recorded and whether other relevant features. Thereafter, block 1008 depicts offset controller 204 determining whether any of the anticipated end features for the program being recorded match the sample.

At block 1008, if no anticipated end features match the sample, then the process passes to block 1020. Block 1020 depicts offset controller 204 determining whether the current time is past the scheduled end time for the program being recorded. If the current time is not past the scheduled end time, then the process returns to block 1004. If the current time is past the scheduled end time, then the process passes to block 1022. Block 1022 illustrates offset controller 204 triggering a recording of the program until the end feature is detected, and the process passes to block 1004.

At block 1008, if the anticipated end feature matches the sample, then the process passes to block 1010. Block 1010 depicts offset controller 204 determining whether the end feature broadcast at the expected time. If the end feature broadcast at the expected time, then the process passes to block 1014. Block 1014 illustrates offset controller 204 setting the offset time for the channel to zero, and the process passes to block 1016. Otherwise, at block 1010, if the end feature did not broadcast at the expected time, then the process passes to block 1012. Block 1012 depicts offset controller 204 calculating an offset time between the actual broadcast time of the end feature and the expected broadcast time of the end feature. Next, block 916 depicts offset controller 204 adjusting the actual recording time by the offset for any scheduled recordings affected by the offset time, and the process ends. For example, if the recording selections also include the next program, then the scheduled recording times of the next program are automatically adjusted by the offset time. In addition, in adjusting an actual recording time, any portions of a program that are sampled and held in cache may be added to start or end of a recording of a program to complete the program recording.

While the invention has been particularly shown and described with reference to a preferred embodiment, it will be understood by those skilled in the art that various changes in form and detail may be made therein without departing from the spirit and scope of the invention.

What is claimed is:

1. A method for synching a recording of a program, at a recording system communicatively connected to receive at least one broadcast signal from at least one service provider, to an actual broadcast time of said program from said broadcast signal, comprising:
   sampling, by said recording system, a portion of a current broadcast signal received from at least one service provider of a program on a particular channel over a particular interval of time;
   caching, by said recording system, at least one image from said sampled portion of said program as a graphic file and at least one audio sample from said sampled portion of said program as an audio file;
   receiving, at said recording system from said at least one service provider, a selection of features anticipated to be broadcast during said program comprising at least one from among a graphical feature and an audio feature;
   comparing, by said recording system, said portion of said current broadcast signal with a selection of features anticipated to be broadcast during said particular interval of time for said program by calculating a percentage of image bytes matching between said cached graphic file and said selection of features and by calculating a percentage of audio signal matching between said cached audio file and said selection of features;
   responsive to matching a particular feature from among said selection of features within at least one of said graphic file with said percentage of image bytes reaching an image threshold and said audio file with said percentage of audio signal reaching an audio threshold, calculating, by said recording system, an offset time from a difference between an expected time for broadcast of said particular feature and an actual time said particular feature matched in said portion of said current broadcast signal; and
   adjusting, by said recording system, a recording time of said program by said offset time, wherein said recording time is initially set to a predetermined broadcast schedule for said program on said particular channel, such that through monitoring features of said current broadcast signal, said recording time of said program is synched to said actual broadcast time of said program on said particular channel.

2. The method for synching according to claim 1, further comprising:
   detecting a particular program in said current broadcast signal on said particular channel that is being recorded has an indeterminate end time independent of a scheduled end time specified in said predetermined broadcast schedule;
   responsive to approaching said scheduled end time for said particular program, triggering said sampling of said portion of said current broadcast signal; and
   responsive to continuing to detect said particular feature for said particular program after said scheduled end time, adjusting said recording time of said particular program to continue recording until said recording system detects a second feature for a next scheduled program.

3. The method for synching according to claim 1, further comprising:
   responsive to not matching a particular feature from among said selection of features within said portion of said current broadcasting signal, continuing to sample a next portion of said current broadcast signal on said particular channel and compare said portion of said current broadcast signal with said selection of features until said particular feature matches within said next portion of said current broadcast signal.

4. The method for synching according to claim 1, wherein sampling a portion of a current broadcast signal on a particular channel over a particular interval of time, further comprises:
  sampling said portion of said current broadcast signal prior to a start time for said program; and
  responsive to detecting said particular feature as a start feature for said program prior to a scheduled start time for said program, adjusting said recording time of said program to begin recording upon detection of said start feature prior to said scheduled start time.

5. The method for synching according to claim 1, further comprising:
  sampling, by said recording system, said portion of said current broadcast signal received from at least one service provider of a program further comprising a close captioning stream;
  searching, by said recording system, said close captioning stream with a text analyzer to detect a plurality of sample words;
  receiving, by said recording system from said at least one service provider, said selection of features further comprising at least one feature word;
  comparing, by said recording system, said portion of said current broadcast signal with said selection of features anticipated to be broadcast during said particular interval of time for said program by calculating a percentage of said plurality of sampled words matching said at least one feature word;
  responsive to said percentage of sampled words reaching a word threshold, calculating, by said recording system, an offset time from a difference between an expected time for broadcast of said particular feature and an actual time said particular feature matched in said portion of said current broadcast signal.

6. The method for synching according to claim 1, wherein comparing said portion of said current broadcast signal with a selection of features anticipated to be broadcast during said particular interval of time, further comprises:
  accessing said selection of features from a database of features accessed from at least one from among a server system, a service provider, at least one user selected feature recording, and at least one automatically recorded feature recording.

7. The method for synching according to claim 1, further comprising:
  responsive to calculating said offset time, sending an electronic communication to a user at a portable electronic device identifying said offset time for said current broadcast signal on said particular channel; and
  enabling said user to adjust recording selections for said recording system via said portable electronic device.

8. The method for synching according to claim 1, further comprising:
  enabling a user to select to record said program in the future from a predetermined program schedule; and
  setting said initial recording time for said program to a start time and an end time for said program in said predetermined program schedule.

9. The method for synching according to claim 1, further comprising:
  comparing information for said program with a database of previously watched programs; and
  canceling recording of said program if said information is already included in a particular entry within said database of previously watched programs.

10. A system for synching a recording of a program to an actual broadcast time of said program, comprising:
  a recording system communicatively connected to receive at least one broadcast signal from at least one service provider;
  said recording system further comprising:
  means for sampling a portion of a current broadcast signal received from at least one service provider of a program on a particular channel over a particular interval of time;
  means for caching at least one image from said sampled portion of said program as a graphic file and at least one audio sample from said sampled portion of said program as an audio file;
  means for receiving a selection of features anticipated to be broadcast during said program comprising at least one from among a graphical feature and an audio feature;
  means for comparing said portion of said current broadcast signal with a selection of features anticipated to be broadcast during said particular interval of time for said program by calculating a percentage of image bytes matching between said cached graphic file and said selection of features and by calculating a percentage of audio signal matching between said cached audio file and said selection of features;
  means, responsive to matching a particular feature from among said selection of features within at least one of said graphic file with said percentage of image bytes reaching an image threshold and said audio file with said percentage of audio signal reaching an audio threshold, for calculating an offset time from a difference between an expected time for broadcast of said particular feature and an actual time said particular feature matched in said portion of said current broadcast signal; and
  means for adjusting a recording time of said program by said offset time, wherein said recording time is initially set to a predetermined broadcast schedule for said program on said particular channel, wherein through monitoring features of said current broadcast signal, said recording time of said program is synched to said actual broadcast time of said program on said particular channel.

11. The system for synching according to claim 10, said recording system further comprising:
  means for detecting a particular program in said current broadcast signal on said particular channel that is being recorded has an indeterminate end time independent of a scheduled end time specified in said predetermined broadcast schedule;
  means, responsive to approaching said scheduled end time for said particular program, for triggering said sampling of said portion of said current broadcast signal; and
  means, responsive to continuing to detect said particular feature for said particular program after said scheduled end time, for adjusting said recording time of said particular program to continue recording until said recording system detects a second feature for a next scheduled program.

12. The system for synching according to claim 10, said recording system further comprising:
- means, responsive to not matching a particular feature from among said selection of features within said portion of said current broadcasting signal, for continuing to sample a next portion of said current broadcast signal on said particular channel and compare said portion of said current broadcast signal with said selection of features until said particular feature matches within said next portion of said current broadcast signal.

13. The system for synching according to claim 10, said means for sampling a portion of a current broadcast signal on a particular channel over a particular interval of time, further comprises:
- means for sampling said portion of said current broadcast signal prior to a start time for said program; and
- means, responsive to detecting said particular feature as a start feature for said program prior to a scheduled start time for said program, adjusting said recording time of said program to begin recording upon detection of said start feature prior to said scheduled start time.

14. The system for synching according to claim 10, said recording system further comprising:
- means for sampling said portion of said current broadcast signal received from at least one service provider of a program further comprising a close captioning stream;
- means for searching said close captioning stream with a text analyzer to detect a plurality of sample words;
- means for receiving said selection of features further comprising at least one feature word;
- means for comparing said portion of said current broadcast signal with said selection of features anticipated to be broadcast during said particular interval of time for said program by calculating a percentage of said plurality of sampled words matching said at least one feature word;
- means, responsive to said percentage of sampled words reaching a word threshold, for calculating, by said recording system, an offset time from a difference between an expected time for broadcast of said particular feature and an actual time said particular feature matched in said portion of said current broadcast signal.

15. The system for synching according to claim 10, said means for comparing said portion of said current broadcast signal with a selection of features anticipated to be broadcast during said particular interval of time, further comprising:
- means for accessing said selection of features from a database of features accessed from at least one from among a server system, a service provider, at least one user selected feature recording, and at least one automatically recorded feature recording.

16. The system for synching according to claim 10, said recording system further comprising:
- means, responsive to calculating said offset time, for sending an electronic communication to a user at a portable electronic device identifying said offset time for said current broadcast signal on said particular channel; and
- means for enabling said user to adjust recording selections for said recording system via said portable electronic device.

17. The system for synching according to claim 10, said recording system further comprising:
- means for enabling a user to select to record said program in the future from a predetermined program schedule; and
- means for setting said initial recording time for said program to a start time and an end time for said program in said predetermined program schedule.

18. The system for synching according to claim 10, said recording system further comprising:
- means for comparing information for said program with a database of previously watched programs; and
- means for canceling recording of said program if said information is already included in a particular entry within said database of previously watched programs.

19. A program for synching a recording of a program to an actual broadcast time of said program, said program embodied in a non-transitory computer-readable medium, said program comprising computer-executable instructions which cause a computer to perform the steps of:
- receiving, by a recording system, at least one broadcast signal from at least one service provider;
- sampling, by said recording system, a portion of a current broadcast signal received from at least one service provider of a program on a particular channel over a particular interval of time;
- caching, by said recording system, at least one image from said sampled portion of said program as a graphic file and at least one audio sample from said sampled portion of said program as an audio file;
- receiving, at said recording system from said at least one service provider, a selection of features anticipated to be broadcast during said program comprising at least one from among a graphical feature and an audio feature;
- comparing, by said recording system, said portion of said current broadcast signal with a selection of features anticipated to be broadcast during said particular interval of time for said program by calculating a percentage of image bytes matching between said cached graphic file and said selection of features and by calculating a percentage of audio signal matching between said cached audio file and said selection of features;
- responsive to matching a particular feature from among said selection of features within at least one of said graphic file with said percentage of image bytes reaching an image threshold and said audio file with said percentage of audio signal reaching an audio threshold, calculating an offset time from a difference between an expected time for broadcast of a particular feature and an actual time said particular feature matched in said portion of said current broadcast signal; and
- adjusting a recording time of said program by said offset time, wherein said recording time is initially set to a predetermined broadcast schedule for said program on said particular channel.

20. The program for synching according to claim 19, said computer-executable instructions further causing said computer to perform the step of:
- continuing to sample a next portion of said current broadcast signal on said particular channel and compare said portion of said current broadcast signal with said selection of features until said particular feature matches within said next portion of said current broadcast signal, responsive to not matching said particular feature from among said selection of features within said portion of said current broadcasting signal.

* * * * *